(12) United States Patent
Jiang et al.

(10) Patent No.: US 12,131,759 B2
(45) Date of Patent: Oct. 29, 2024

(54) TWO-DIMENSIONAL MAGNETIC RECORDING READ HEAD WITH TAOX LAYER FOR FLAT MIDDLE SHIELD TOPOGRAPHY AND METHOD OF FORMING THEREOF

(71) Applicant: Western Digital Technologies, Inc., San Jose, CA (US)

(72) Inventors: Hongquan Jiang, San Jose, CA (US); Guanxiong Li, Fremont, CA (US); Ming Mao, Dublin, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/226,609

(22) Filed: Jul. 26, 2023

(65) Prior Publication Data

US 2024/0153533 A1    May 9, 2024

Related U.S. Application Data

(60) Provisional application No. 63/423,636, filed on Nov. 8, 2022.

(51) Int. Cl.
*G11B 5/39* (2006.01)
*G11B 5/11* (2006.01)
(Continued)

(52) U.S. Cl.
CPC .............. *G11B 5/3948* (2013.01); *G11B 5/11* (2013.01); *G11B 5/3163* (2013.01); *G11B 5/3932* (2013.01); *G11B 5/59688* (2013.01)

(58) Field of Classification Search
None
See application file for complete search history.

(56) References Cited

U.S. PATENT DOCUMENTS 8,136,226 B2   3/2012   Gill et al.
8,970,988 B1   3/2015   Li et al.
(Continued)

FOREIGN PATENT DOCUMENTS

WO   WO-2021162732 A1 *   8/2021   ......... G01R 33/0076
WO   WO-2023075859 A1 *   5/2023   ............... G11B 5/11

OTHER PUBLICATIONS

Lippman, Thomas et al., "Spinstand demonstration of areal density enhancement using two-dimensional magnetic recording (invited)", Journal of Applied Physics, AIP Publishing, Mar. 2015, <http://dx.doi.org/10.1063/1.4914051>.

*Primary Examiner* — William J Klimowicz
(74) *Attorney, Agent, or Firm* — PATTERSON + SHERIDAN, LLP

(57) ABSTRACT

The present disclosure generally relates to a dual free layer (DFL) two dimensional magnetic recording (TDMR) read head, and a method of forming thereof. The read head comprises a lower sensor, middle shields disposed on the lower sensor, and an upper sensor disposed on the middle shields. After the lower reader is formed, a dielectric layer is deposited around an outer perimeter of the lower shield. Portions of the dielectric layer are ion milled such that the remaining portions form a substantially flat layer. Another embodiment includes a deposition of a TaOx layer on the dielectric layer, where x is a numeral. Portions of the dielectric layer and the TaOx layer are then ion milled such that the remaining portions of the TaOx layer and the dielectric layer collectively form a substantially planar layer. The middle shields are formed over the lower reader and are substantially planar.

28 Claims, 13 Drawing Sheets

(51) Int. Cl.
*G11B 5/31* (2006.01)
*G11B 5/596* (2006.01)

(56) References Cited

U.S. PATENT DOCUMENTS

| | | | |
|---|---|---|---|
| 9,042,059 B1 | 5/2015 | Katine et al. | |
| 9,087,527 B1* | 7/2015 | Li | G11B 5/3958 |
| 9,280,992 B1* | 3/2016 | Jiang | G11B 5/3932 |
| 9,324,342 B2 | 4/2016 | Sapozhnikov et al. | |
| 9,406,321 B2 | 8/2016 | Kief et al. | |
| 9,513,349 B2* | 12/2016 | Gill | G11B 5/3932 |
| 9,570,100 B1* | 2/2017 | Freitag | G11B 5/3912 |
| 9,721,595 B1 | 8/2017 | Rudy et al. | |
| 9,786,305 B1 | 10/2017 | Li et al. | |
| 10,714,131 B1* | 7/2020 | Wu | G11B 5/3906 |
| 10,755,733 B1* | 8/2020 | Zheng | G11B 5/3929 |
| 10,777,222 B1* | 9/2020 | Liu | G11B 5/3909 |
| 11,087,785 B1* | 8/2021 | Mao | G11B 5/3909 |
| 11,170,808 B1* | 11/2021 | Liu | G11B 5/3912 |
| 11,170,809 B1* | 11/2021 | Mao | G11B 5/3909 |
| 11,514,933 B1* | 11/2022 | Chien | G11B 5/3932 |
| 11,514,934 B1* | 11/2022 | Mao | G11B 5/3954 |
| 11,514,935 B1* | 11/2022 | Liu | G11B 5/11 |
| 11,783,853 B1* | 10/2023 | Liu | G11B 5/11 360/324.2 |
| 2007/0019340 A1* | 1/2007 | Gill | G11B 5/3932 360/324.11 |
| 2014/0153138 A1* | 6/2014 | Le | G11B 5/11 360/294 |
| 2014/0293472 A1* | 10/2014 | Balamane | G11B 5/398 216/22 |
| 2014/0340791 A1* | 11/2014 | Braganca | G11B 5/398 360/234.4 |
| 2015/0154990 A1* | 6/2015 | Jiang | G11B 5/3932 216/22 |
| 2017/0154641 A1* | 6/2017 | Hao | G11B 5/3977 |
| 2017/0337941 A1* | 11/2017 | Xiao | G11B 5/112 |
| 2019/0221232 A1* | 7/2019 | Le | G11B 5/3932 |
| 2020/0176024 A1* | 6/2020 | Quan | G11B 5/3951 |
| 2021/0390978 A1 | 12/2021 | Hu et al. | |

* cited by examiner

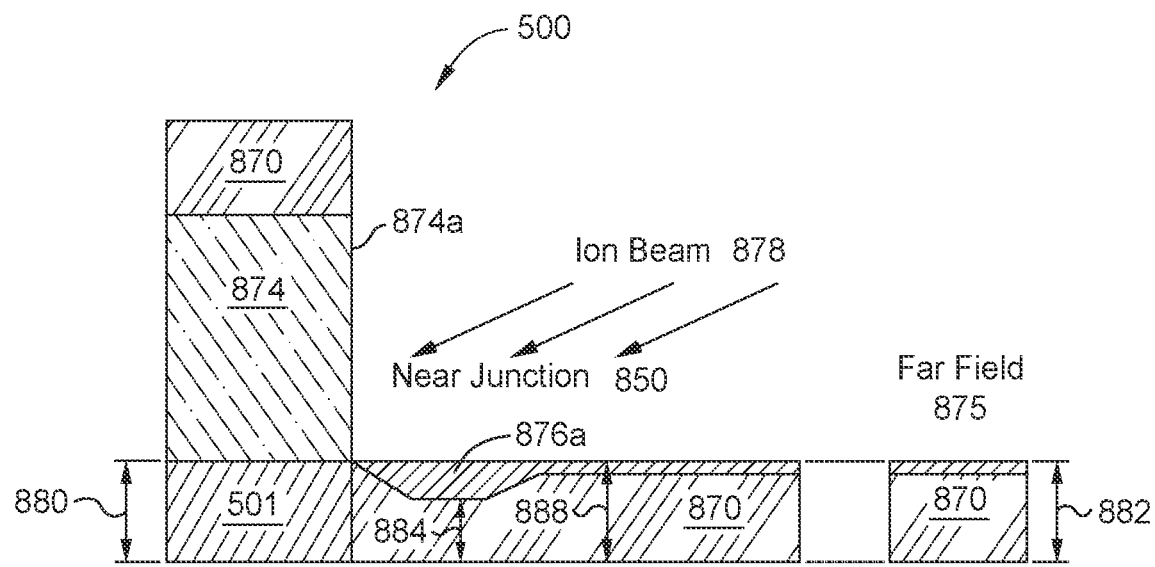
FIG. 8B
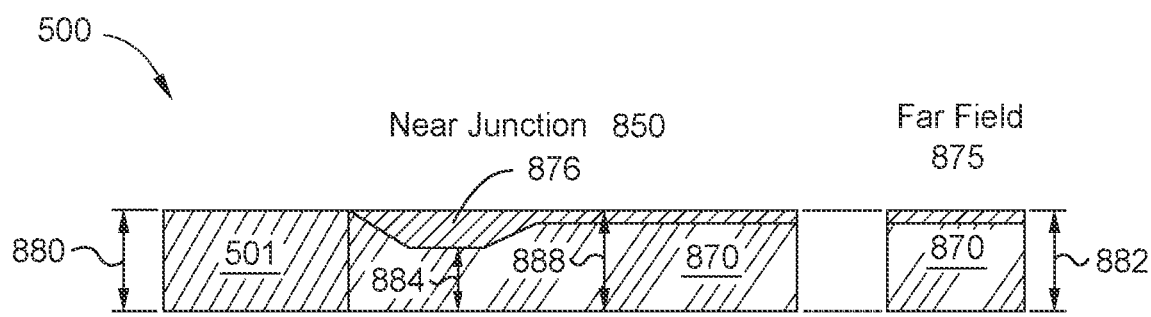
FIG. 8C
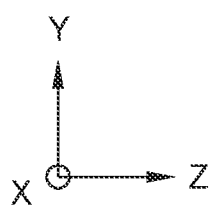

TWO-DIMENSIONAL MAGNETIC RECORDING READ HEAD WITH TAOX LAYER FOR FLAT MIDDLE SHIELD TOPOGRAPHY AND METHOD OF FORMING THEREOF

CROSS-REFERENCE TO RELATED APPLICATIONS

This application claims benefit of U.S. provisional patent application Ser. No. 63/423,636, filed Nov. 8, 2022, which is herein incorporated by reference.

BACKGROUND OF THE DISCLOSURE

Field of the Disclosure

Embodiments of the present disclosure generally relate to a dual free layer (DFL) two dimensional magnetic recording (TDMR) read head.

Description of the Related Art

Two dimensional magnetic recording (TDMR) read heads generally have a first sensor, oftentimes referred to as a lower reader and a second sensor, oftentimes referred to as an upper reader. The readers each have lower and upper shields with an insulating reader separation gap (RSG) therebetween. Both the top reader and the bottom reader are substantially identical, each comprising two free layers to be dual free layer (DFL) readers or sensors. In DFL reader operation, the two free layers or each reader are individually stabilized longitudinally by an anti-ferromagnetically coupled (AFC) soft bias (SB) and biased transversally by a permanent magnet or a rear hard bias (RHB) structure from the stripe back edge of the sensor.

A transverse bias field of TDMR read heads is determined by the remnant magnetization (Mr) times thickness (t) product (i.e., Mr*t) of the RHB structure. Since a saturation magnetization, Ms, and thus, the Mr of the RHB is quite limited (e.g., as compared to the Ms of the soft bias), a thicker RHB is generally required to achieve the desired transverse bias field. The thicker RHB needed results in an increased topography along the reader stripe height (SH) direction. The large topography poses a challenge to TDMR DFL reader designs, as the large topography limits the read head's capacity in down track spacing (DTS), somewhat offsetting the intrinsic narrow shield-shield (S-S) advantage of DFL readers. A wide DTS can cause the two readers to become misaligned at large skew, thereby limiting the fraction of the disk accessible in TDMR mode. As such, the lower reader and the upper reader may be formed asymmetrically with a deeper over mill (OM) to lower the RHB for the lower reader and a shallower OM for the upper reader to address the topography issue of the middle shield (MS) for narrower DTS. The dielectric refill surrounding the lower reader, including the first DFL sensor, the first SB shield, and the first RHB structure, also generates an undesirable topography, hence affecting the integrity of the MS and limits a narrower DTS.

Therefore, there is a need in the art for an improved TDMR read head by addressing the topography issue from the dielectric refill, particularly, surrounding the lower reader.

SUMMARY OF THE DISCLOSURE

The present disclosure generally relates to a dual free layer (DFL) two dimensional magnetic recording (TDMR) read head, and a method of forming thereof. The read head comprises a lower sensor, middle shields disposed on the lower sensor, and an upper sensor disposed on the middle shields. After the lower reader is formed, a dielectric layer is deposited around an outer perimeter of the lower shield. In one embodiment, portions of the dielectric layer are then ion milled such that the topography is flattened and the remaining portions of the dielectric layer gradually taper down from the outer perimeter to the far field. The middle shields and upper reader are formed over the lower reader and the substantially flat layer, and the middle shields are substantially flat. In another embodiment, a TaOx layer, where x is a numeral, is deposited on the dielectric layer. Portions or all of the TaOx layer are then ion milled such that the remaining portions of the TaOx layer the dielectric layer collectively form a substantially planar layer. The middle shields and upper reader are formed over the lower reader and the substantially planar layer, and the middle shields are substantially planar.

In one embodiment, a read head comprises a first sensor disposed at a media facing surface (MFS), a first rear hard bias (RHB) structure disposed adjacent to the first sensor recessed from the MFS, first soft bias shields disposed adjacent to the first sensor at the MFS, a dielectric layer disposed around an outer perimeter of the first sensor, the first soft bias shields, and the first RHB structure, the dielectric layer being substantially planar, wherein the dielectric layer comprises TaOx, where x is an integer greater than 1, a middle shield disposed over the first sensor, the first soft bias shields, and the first RHB structure, the middle shield being substantially planar, and a second sensor disposed at the MFS on the middle shield.

In another embodiment, a method of forming a read head comprises forming a lower reader, the lower reader comprising a first sensor disposed at a media facing surface (MFS), a first rear hard bias (RHB) structure disposed adjacent to the first sensor recessed from the MFS, and first soft bias shields disposed adjacent to the first sensor at the MFS, defining one or more dimensions of the lower reader, depositing a dielectric layer around an outer perimeter of the lower reader, ion milling portions of the dielectric layer such that the remaining portions of the dielectric layer form a substantially flat layer that gradually tapers down from near the first sensor, the first RHB structure, and the first soft bias shields to a far field location, the far field location being spaced from the first sensor, the first RHB structure, and the first soft bias shields, forming a middle shield over the substantially flat layer and the lower reader, and forming an upper reader over the middle shield.

In another embodiment, a method of forming a read head comprises forming a lower reader, the lower reader comprising a first sensor disposed at a media facing surface (MFS), a first rear hard bias (RHB) structure disposed adjacent to the first sensor recessed from the MFS, and first soft bias shields disposed adjacent to the first sensor at the MFS, defining one or more dimensions of the lower reader, depositing a dielectric layer around an outer perimeter of the lower reader, depositing a TaOx layer, where x is a numeral, on the dielectric layer, ion milling portions of the TaOx layer such that the remaining portions of the TaOx layer and the dielectric layer collectively form a substantially planar layer, forming a middle shield over the substantially planar layer and the lower reader, and forming an upper reader over the middle shield.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 8A-8C illustrate cross-sectional views of flattening the topography of a dielectric layer surrounding a lower reader of the DFL TDMR read head of FIGS. 5A-5B and FIG. 6 to form a substantially flat or linear surface, according to another embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a dual free layer (DFL) two dimensional magnetic recording (TDMR) read head, and a method of forming thereof. The read head comprises a lower sensor, middle shields disposed on the lower sensor, and an upper sensor disposed on the middle shields. After the lower reader is formed, a dielectric layer is deposited around an outer perimeter of the lower shield. According to one embodiment, portions of the dielectric layer are then ion milled such that the remaining portions of the dielectric layer form a substantially flat layer gradually tapering down from the outer perimeter to the far field. The middle shields and upper reader are formed over the lower reader and the substantially flat layer, and the middle shields are substantially flat. According to another embodiment, a TaOx layer, where x is a numeral, is deposited on the dielectric layer. Portions of the TaOx layer are then ion milled such that the remaining portions of the TaOx layer and the dielectric layer collectively form a substantially planar layer. The middle shields and upper reader are formed over the lower reader and the substantially planar layer, and the middle shields are substantially planar.

Figure 1:
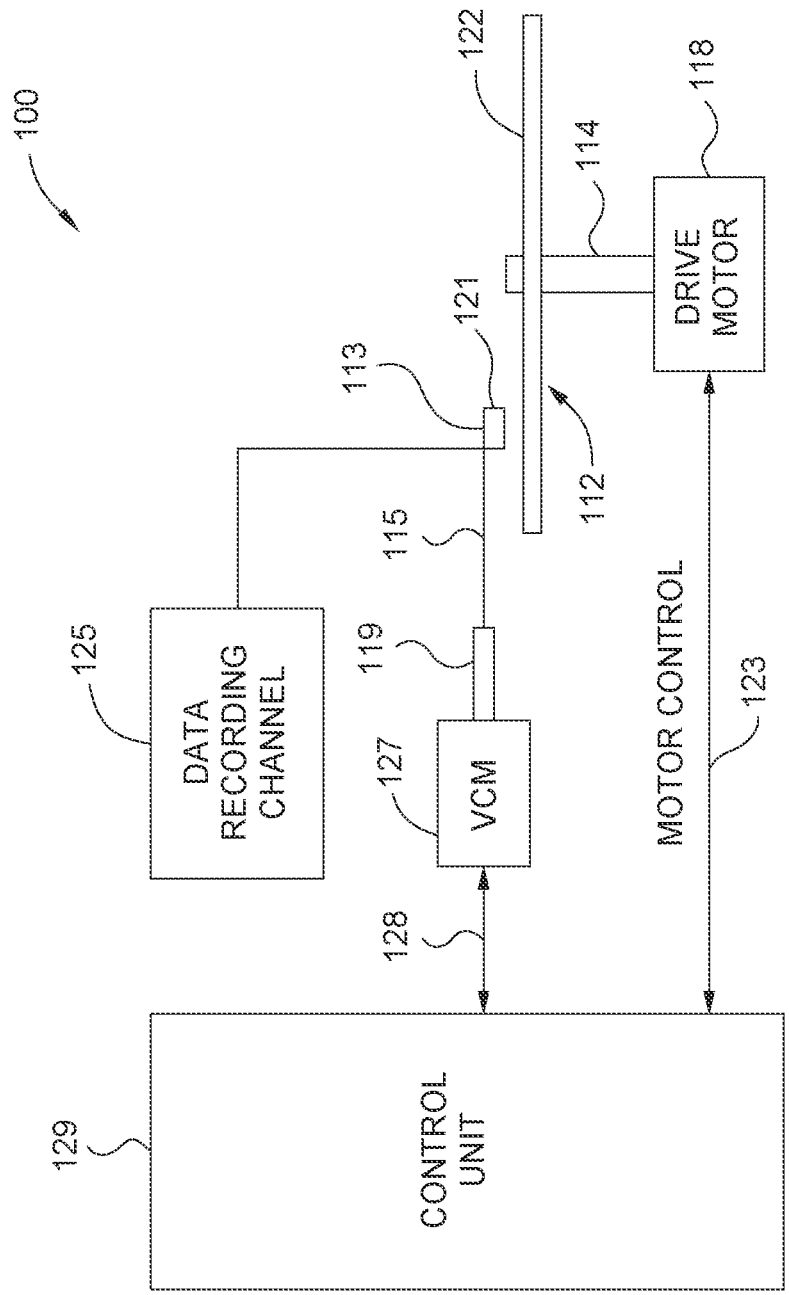
FIG. 1 illustrates a disk drive embodying this disclosure.

FIG. 1 illustrates a disk drive 100 embodying this disclosure. As shown, at least one rotatable magnetic media 112 is supported on a spindle 114 and rotated by a disk drive motor 118. The magnetic recording on each disk is in the form of any suitable patterns of data tracks, such as annular patterns of concentric data tracks (not shown) on the magnetic media 112.

At least one slider 113 is positioned near the magnetic media 112, each slider 113 supporting one or more magnetic head assemblies 121. As the magnetic media rotates, the slider 113 moves radially in and out over the media surface 122 so that the magnetic head assembly 121 may access different tracks of the magnetic media 112 where desired data are written. Each slider 113 is attached to an actuator arm 119 by way of a suspension 115. The suspension 115 provides a slight spring force which biases the slider 113 toward the media surface 122. Each actuator arm 119 is attached to an actuator means 127. The actuator means 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic media 112 generates an air bearing between the slider 113 and the media surface 122 which exerts an upward force or lift on the slider 113. The air bearing thus counterbalances the slight spring force of suspension 115 and supports slider 113 off and slightly above the media 112 surface by a small, substantially constant spacing during normal operation. In the case of EAMR, a DC magnetic field generated from an assist element of the magnetic head assembly 121 enhances the write-ability so that the write element of the magnetic head assembly 121 may efficiently magnetize the data bits in the media 112.

The various components of the disk drive 100 are controlled in operation by control signals generated by control unit 129, such as access control signals and internal clock signals. Typically, the control unit 129 comprises logic control circuits, storage means, and a microprocessor. The control unit 129 generates control signals to control various system operations, such as drive motor control signals on line 123 and head position and seek control signals on line 128. The control signals on line 128 provide the desired current profiles to optimally move and position slider 113 to the desired data track on media 112. Write and read signals are communicated to and from write and read heads on the assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

It is to be understood that the embodiments discussed herein are applicable to a data storage device such as a hard disk drive (HDD) as well as a tape drive such as a tape embedded drive (TED) or an insertable tape media drive, such as those conforming to the LTO (Linear Tape Open) standards. An example TED is described in co-pending patent application titled "Tape Embedded Drive," U.S. application Ser. No. 16/365,034, filed Mar. 31, 2019, assigned to the same assignee of this application, which is herein incorporated by reference. As such, any reference in the detailed description to an HDD or tape drive is merely for exemplification purposes and is not intended to limit the disclosure unless explicitly claimed. For example, references to disk media in an HDD embodiment are provided as examples only, and can be substituted with tape media in a tape drive embodiment. Furthermore, reference to or claims directed to magnetic recording devices or data storage devices are intended to include at least both HDD and tape drive unless HDD or tape drive devices are explicitly claimed.

Figure 2:
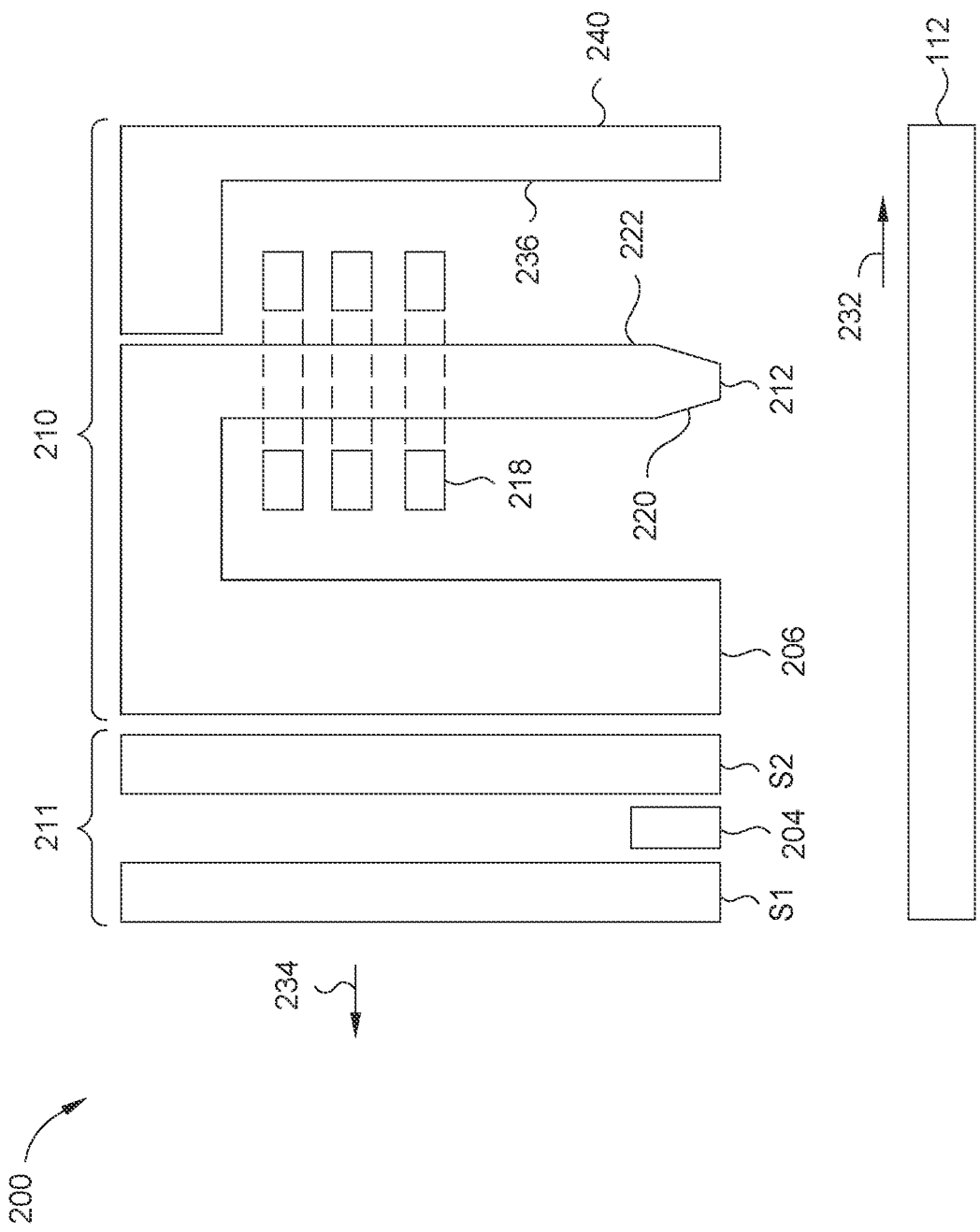
FIG. 2 is a fragmented, cross-sectional side view through the center of a read/write head facing a magnetic media, according to one embodiment.

FIG. 2 is a fragmented, cross sectional side view through the center of a read/write head 200 facing the magnetic media 112, according to one embodiment. The read/write head 200 may correspond to the magnetic head assembly 121 described in FIG. 1. The read/write head 200 includes a media facing surface (MFS) 212, such as an air bearing surface (ABS), a magnetic write head 210, and a magnetic read head 211, and is mounted such that the MFS 212 is facing the magnetic media 112. The read/write head 200 may be an energy-assisted magnetic recording (EAMR) head or a perpendicular magnetic recording (PMR) head. In FIG. 2, the magnetic media 112 moves past the write head 210 in the direction indicated by the arrow 232 and the read/write head 200 moves in the direction indicated by the arrow 234.

In some embodiments, the magnetic read head 211 is a SOT differential reader 204 located between the shields S1 and S2. In other embodiments, the magnetic read head 211 is a magnetoresistive (MR) read head that includes an MR sensing element 204 located between MR shields S1 and S2. In some other embodiments, the magnetic read head 211 is a magnetic tunnel junction (MTJ) read head that includes a MTJ sensing element 204 located between MR shields S1 and S2. The magnetic fields of the adjacent magnetized regions in the magnetic media 112 are detectable by the MR (or MTJ) sensing element 204 as the recorded bits.

The write head 210 includes a return pole 206, a main pole 220, a trailing shield 240, and a coil 218 that excites the main pole 220. The coil 218 may have a "pancake" structure which winds around a back-contact between the main pole 220 and the return pole 206, instead of a "helical" structure shown in FIG. 2. A trailing gap (not shown) and a leading gap (not shown) may be in contact with the main pole and a leading shield (not shown) may be in contact with the leading gap. A recording magnetic field is generated from the main pole 220 and the trailing shield 240 helps making the magnetic field gradient of the main pole 220 steep. The main pole 220 may be a magnetic material such as a FeCo alloy. The main pole 220 may include a trailing surface 222 which may be parallel to a leading surface 236 of the trailing shield 240. The main pole 220 may be a tapered write pole (TWP) with a trailing edge taper (TET) configuration. In one embodiment, the main pole 220 has a saturated magnetization (Ms) of 2.4 T and a thickness of about 300 nanometers (nm). The main pole 220 may comprise ferromagnetic materials, typically alloys of one or more of Co, Fe, and Ni. The trailing shield 240 may be a magnetic material such as NiFe alloy. In one embodiment, the trailing shield 240 has an Ms of about 1.2 T to about 1.6 T.

Figure 3A:
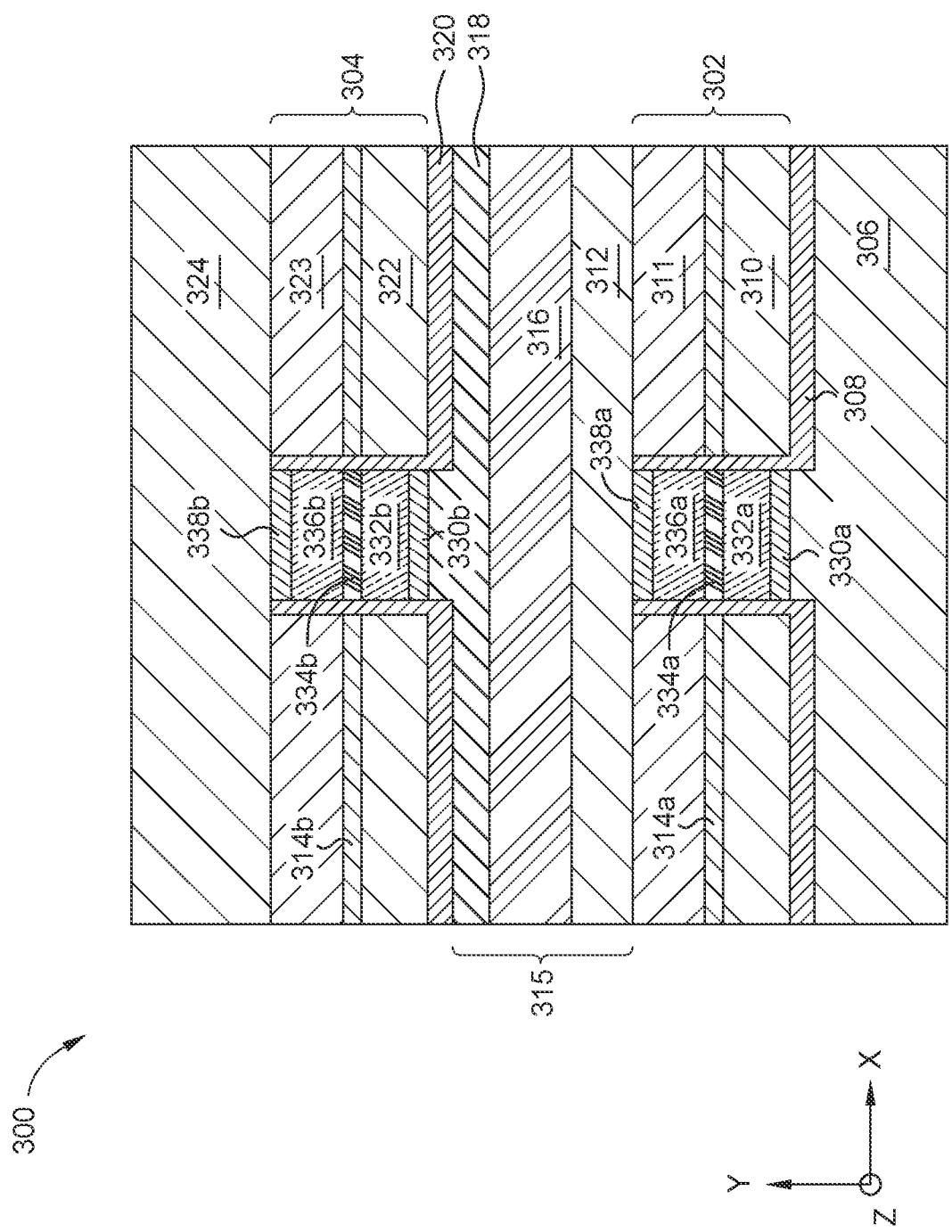
FIGS. 3A-3B illustrate various views of a DFL TDMR read head comprising two sensors or readers, according to previous embodiments
Figure 3B:
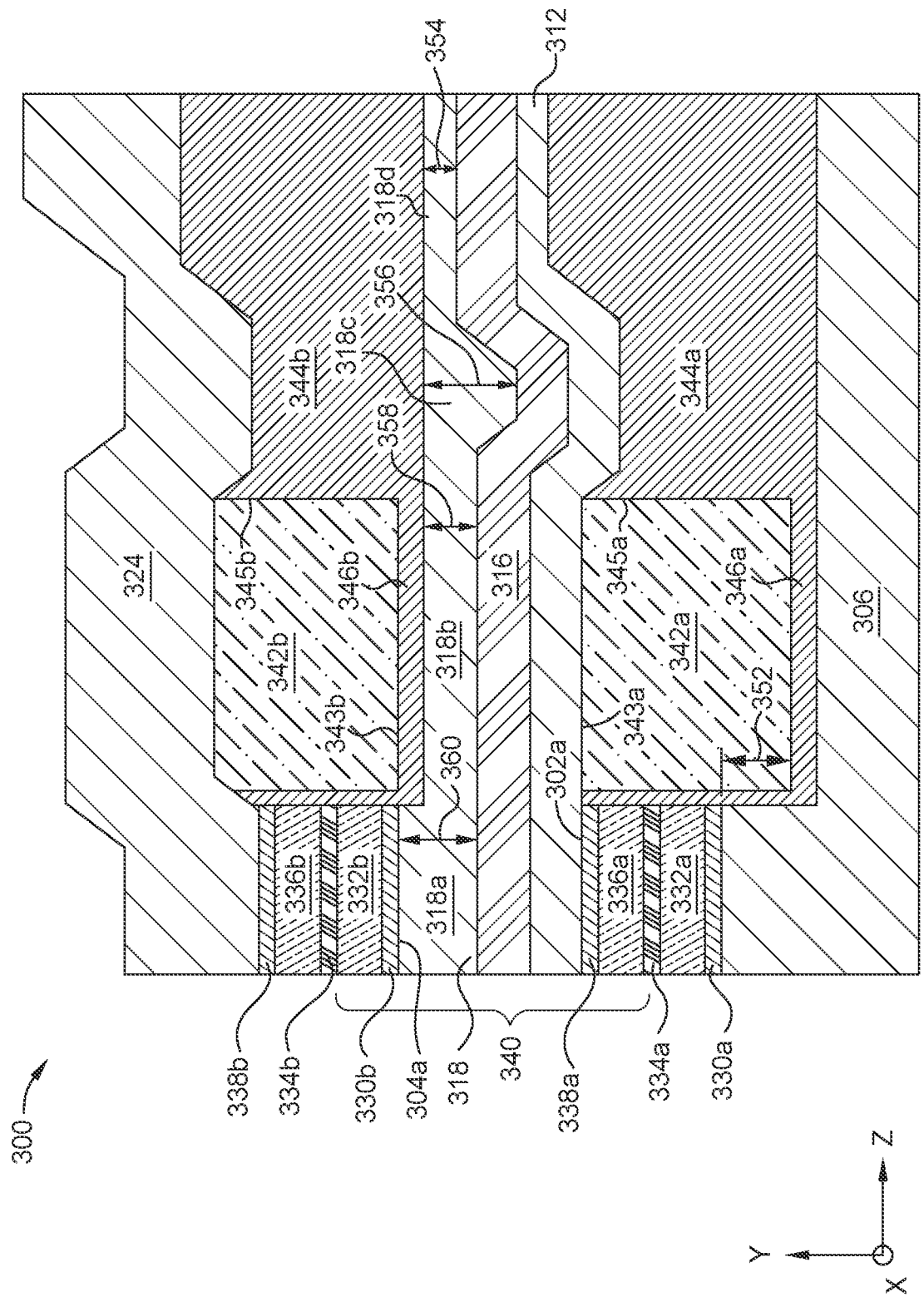

FIGS. 3A-3B illustrate various views of a dual free layer (DFL) two dimensional magnetic recording (TDMR) read head 300 comprising two sensors or readers 302, 304, according to one embodiment. FIG. 3A illustrates a media facing surface (MFS) view of the DFL TDMR read head 300, and FIG. 3B illustrates a cross-sectional view of the DFL TDMR read head 300.

The DFL TDMR read head 300 comprises a first lower shield 306, a first insulation layer 308 disposed on the first shield 306, a first sensor or reader 302 disposed on the first lower shield 306 between portions of the first insulation layer 308, a first upper shield 312 disposed over the first sensor 302, a read separation gap (RSG) 316 disposed on the first upper shield 312, a second lower shield 318 disposed on the RSG 316, a second insulation layer 320 disposed on the second lower shield 318, a second sensor or reader 304 disposed on the second lower shield 318 between portions of the second insulation layer 320, and a second upper shield 324 disposed over the second sensor 304. The RSG 316 may comprise AlOx, where x is an integer greater than or equal to 1. The first and second sensors 302, 304 may each individually be tunnel magnetoresistance (TMR) sensors or magnetic tunnel junction (MTJ) sensors. The first and second sensors 302, 304 may be interchangeably referred to as a first reader 302 and a second reader 304 throughout. The first upper shield 312, the RSG 316, and the second lower shield 318 may collectively be referred to herein as middle shields 315.

The first reader 302 comprises a seed layer 330a, a first free layer 332a disposed on the seed layer 330a, a barrier layer 334a disposed on the first free layer 332a, a second free layer 336a disposed on the barrier layer 334a, and a cap layer 338a disposed on the second free layer 336a. The second reader 304 comprises a seed layer 330b, a first free layer 332b disposed on the seed layer 330b, a barrier layer 334b disposed on the first free layer 332b, a second free layer 336b disposed on the barrier layer 334b, and a cap layer 338b disposed on the second free layer 336b.

First soft bias layers 310 are disposed on the first insulation layer 308 for the first reader 302 and an anti-ferromagnetically coupled (AFC) layer 314a is disposed between the first soft bias layers 310 and second soft bias layers 311. The first and second soft bias layers 310, 311 are disposed on either side of the first sensor 302 in the x-direction. Similarly, first soft bias layers 322 are disposed on the second insulation layer 320 for the second reader and an AFC layer 314b is disposed between the first soft bias layers 322 and second soft bias layers 323. The first and second soft bias layers 322, 323 are disposed on either side of the second sensor 304 in the x-direction.

The first upper shield 312 and the second upper shield 324 may each individually comprise a magnetic material similar to the soft bias material, such as NiFe, NiFe/CoFe laminates, NiFe/NiFeCr laminates, or NiFe/W laminates, for example ("/" as used here denotes separate layers in a multi-layer stack). The first upper shield 312 and the second upper shield 324 may also each individually comprise a magnetic material similar to the soft bias material exchange biased by an antiferromagnet, such as IrMn, IrCrMn. The first upper shield 312 and the second upper shield 324 connect seamlessly to the second soft bias layers 311, 323, respectively. The first insulation layer 308 extends in the y-direction on each side of the first sensor 302 to prevent the first sensor 302 from contacting the first soft bias layer 310, the AFC layer 314a, and the second soft bias layer 311. Similarly, the first insulation layer 320 extends in the y-direction on each side of the second sensor 304 to prevent the second sensor 304 from contacting the second soft bias layer 322, and the AFC layer 314b, and the second soft bias layer 323. The AFC layers 314a and 314b comprise a CoFe/Ru/CoFe tri-layer.

As shown in FIG. 3B, a down-track spacing (DTS) 340 between the first barrier layer 334a of the first sensor 302 and the second barrier layer 334b of the second sensor 304 is about 75 nm to about 85 nm. A first rear hard bias (RHB) structure 342a is disposed behind the first reader 302, recessed from the MFS in the z-direction. A first insulation layer 346a is disposed between the first RHB structure 342a and the first reader 302, and between the first RHB structure 342a and the first lower shield 306. A second RHB structure 342b is disposed behind the second reader 304, recessed from the MFS in the z-direction. A second insulation layer 346b is disposed between the second RHB structure 342b and the second reader 304, and between the second RHB structure 342b and the second lower shield 318. A third insulation layer 344a is disposed behind the first RHB structure 342a. The fourth insulation layer 344b is disposed behind the first RHB structure 342b. The insulation layers 308, 346a, 346b, 344a, and 344b may each individually comprise MgO, AlOx, SiNx, SiOx and their laminates, where x is an integer greater than or equal to 1.

A first surface 343a of the first RHB structure 342a disposed adjacent to the first upper shield 312 is substantially flush or aligned with a first surface 302a of the first reader 302. In other words, the first RHB structure 342a and the second insulating layer 346a are substantially flush or aligned with the top surface 302a of the cap layer 338a of the first sensor 302 in the z-direction. The lower surface of the first upper shield 312 and the top surface of the first RHB structure 342a are aligned in z-direction up to the back edge 345a of the first RHB structure 342a. Similarly, a first surface 343b of the second RHB structure 342b is substantially flush or aligned with a first surface 304a of the second reader 304 in the z-direction. In other words, the second RHB structure 342b is substantially flush or aligned with the bottom surface 304a of the seed layer 330b of the second sensor 304 in the z-direction.

The first RHB structure 342a of the read head 300 is recessed into the first lower shield 306 a distance 352 of about 15 nm to about 20 nm. Because the first RHB structure 342a is substantially flush or aligned with the first reader 302, the first upper shield 312 and the RSG 316 each extends substantially linearly along the z-axis from the MFS into the read head 300 such that the first upper shield 312 and the RSG 316 are planar.

Additionally, because the first upper shield 312 and the RSG 316 of the DFL TDMR read head 300 are each planar or extend substantially linearly along the z-axis, the second lower shield 318 comprises two portions. As shown in FIG. 3B, a first portion 318a of the second lower shield 318 disposed at the MFS adjacent to the second reader 304 has a first thickness 360 in the y-direction of about 20 nm to about 30 nm, and a second portion 318b of the second lower shield 318 disposed between the RSG 316 and the second insulation layer 344b has a second thickness 358 in the y-direction of greater than or equal to about 10 nm, such as about 15 nm to about 20 nm.

Because the first surface 343a of the first RHB structure 342a is aligned with the first surface 302a of the first sensor 302, and because the first surface 343b of the second RHB structure 342b is aligned with the first surface 304a of the second sensor 304, the first and second sensors or readers 302, 304 are physically asymmetric, where a bulk or majority of the first RHB structure 342a is disposed below (i.e., the −y-direction) the first sensor 302, and where a bulk or majority of the second RHB structure 342b is disposed above (i.e., the y-direction) the second sensor 304. As such, the DTS 340 between the first and second readers 302, 304 is decreased, enabling a larger fraction of the disk to be operated in TDMR mode hence improving the performance and reliability, both magnetically and electronically, of the read head 300. However, the topographic features of the dielectric layer 344a behind the back edge 345a of the first RHB structure 342a causes large thickness variations, labeled as 356 and 354, of the second lower shield, 318c and 318d, and then prevent the afore-described narrower DTS entitlement from realization.

Figure 4A:
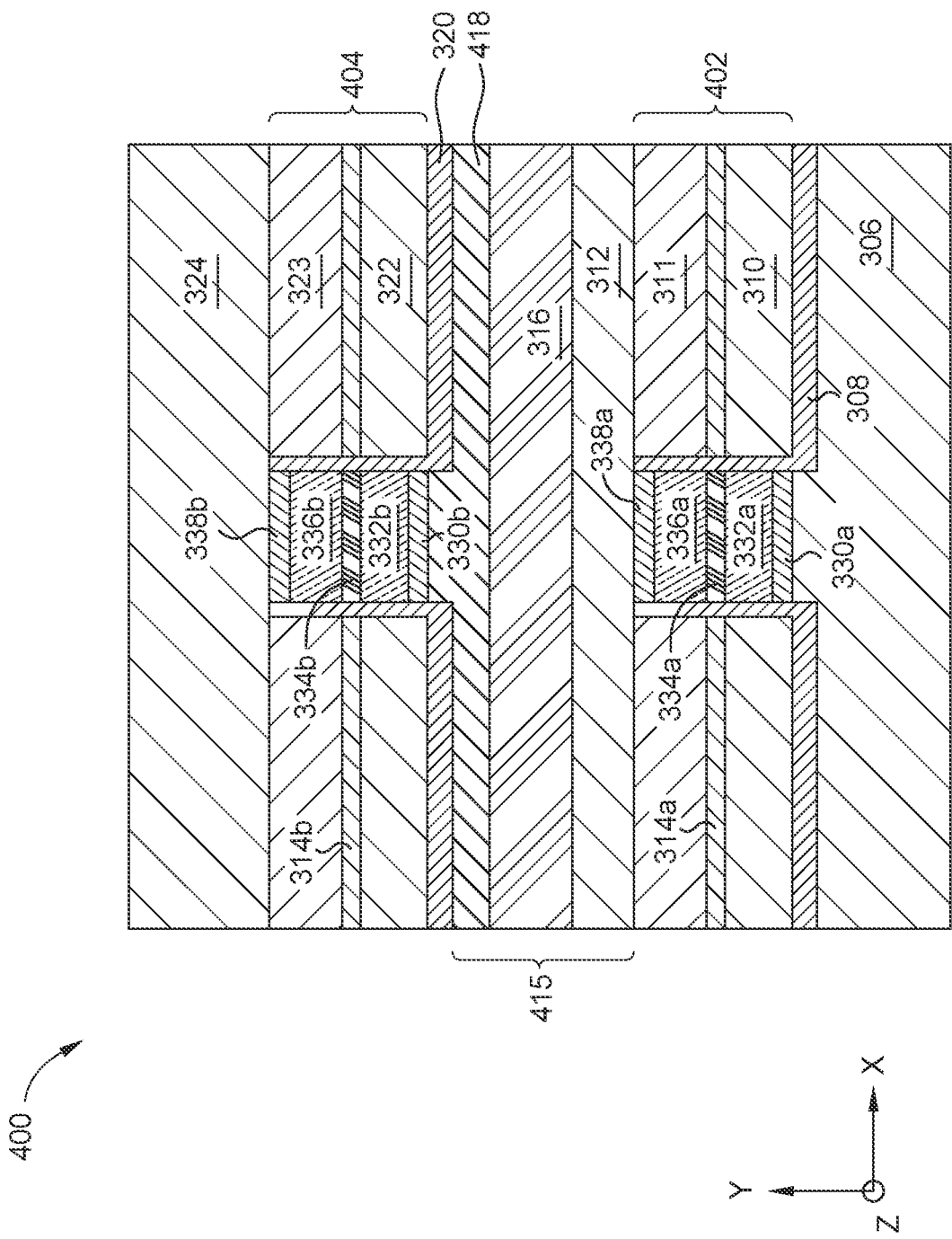
FIGS. 4A-4B illustrate various views of a DFL TDMR read head comprising two sensors or readers, according to one embodiment
Figure 4B:
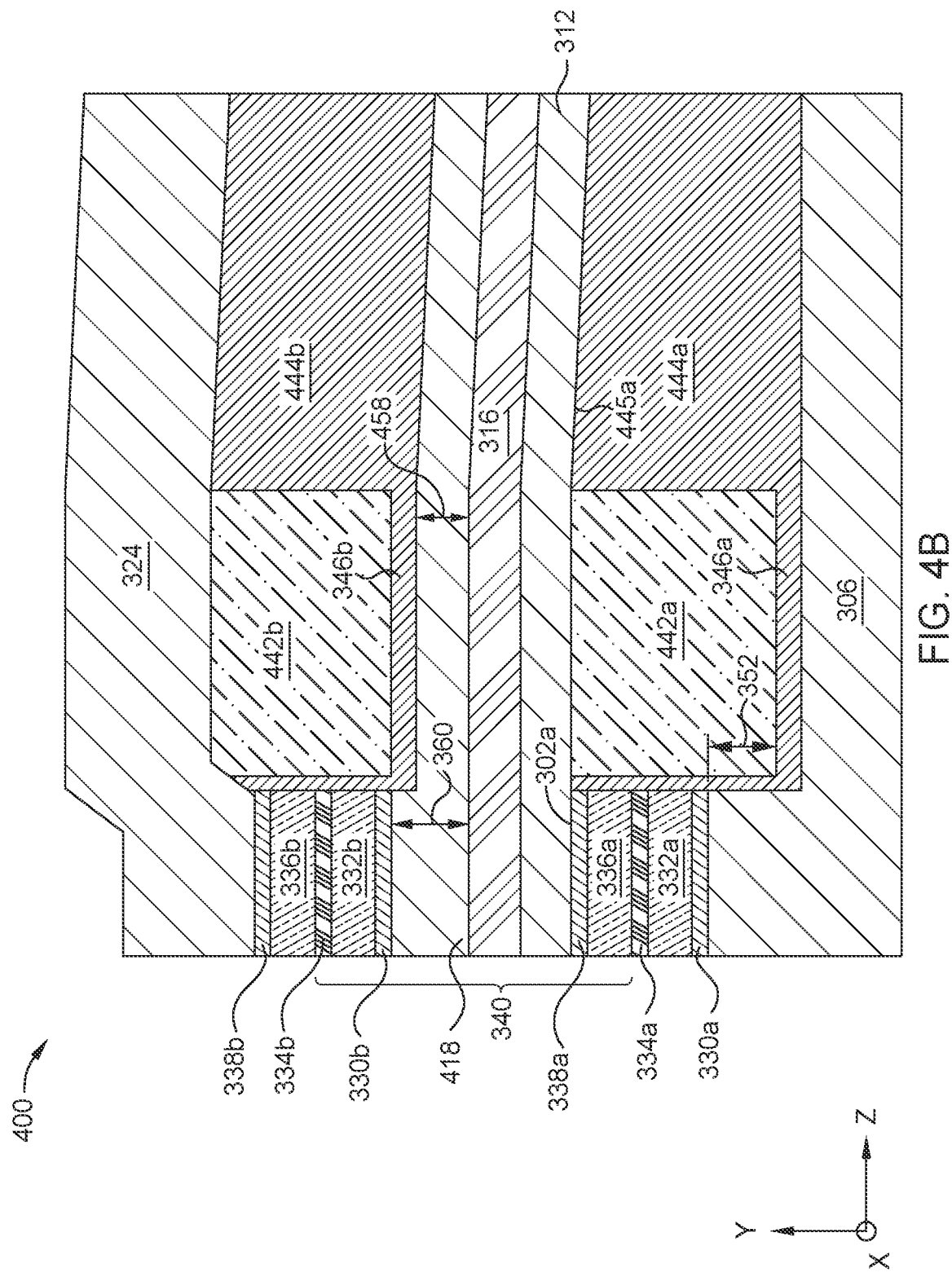

FIGS. 4A-4B illustrate various views of a dual free layer (DFL) two dimensional magnetic recording (TDMR) read head 400 comprising two sensors or readers 402, 404, according to one embodiment. The read head 400 of FIGS. 4A-4B may be similar to the read head 300 of FIGS. 3A-3B except where noted below. FIG. 4A illustrates a media facing surface (MFS) view of the DFL TDMR read head 400, with 415 denoting the middle shields and 418 denoting the second lower shield. FIG. 4B illustrates a cross-sectional view of the DFL TDMR read head 400, where the topographic features of the dielectric layer 444a behind the back edge 445a of the first RHB structure 442a are flattened, and the thickness 458 of the second lower shield 418 remains nearly constant but tapers down toward the far field along the z-direction.

Figure 5A:
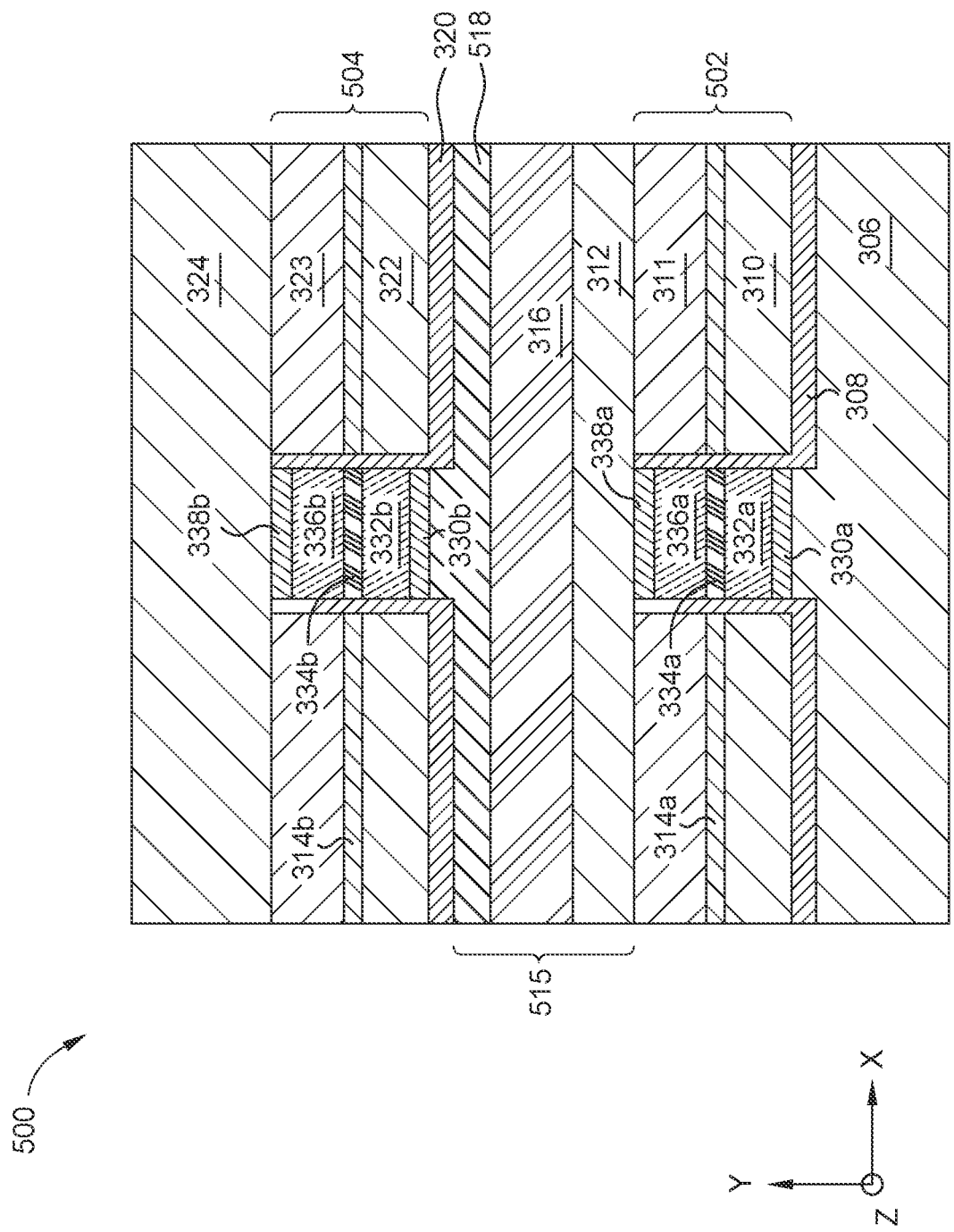
FIGS. 5A-5B illustrate various views of a DFL TDMR read head comprising two sensors or readers, according to previous embodiments.
Figure 5B:
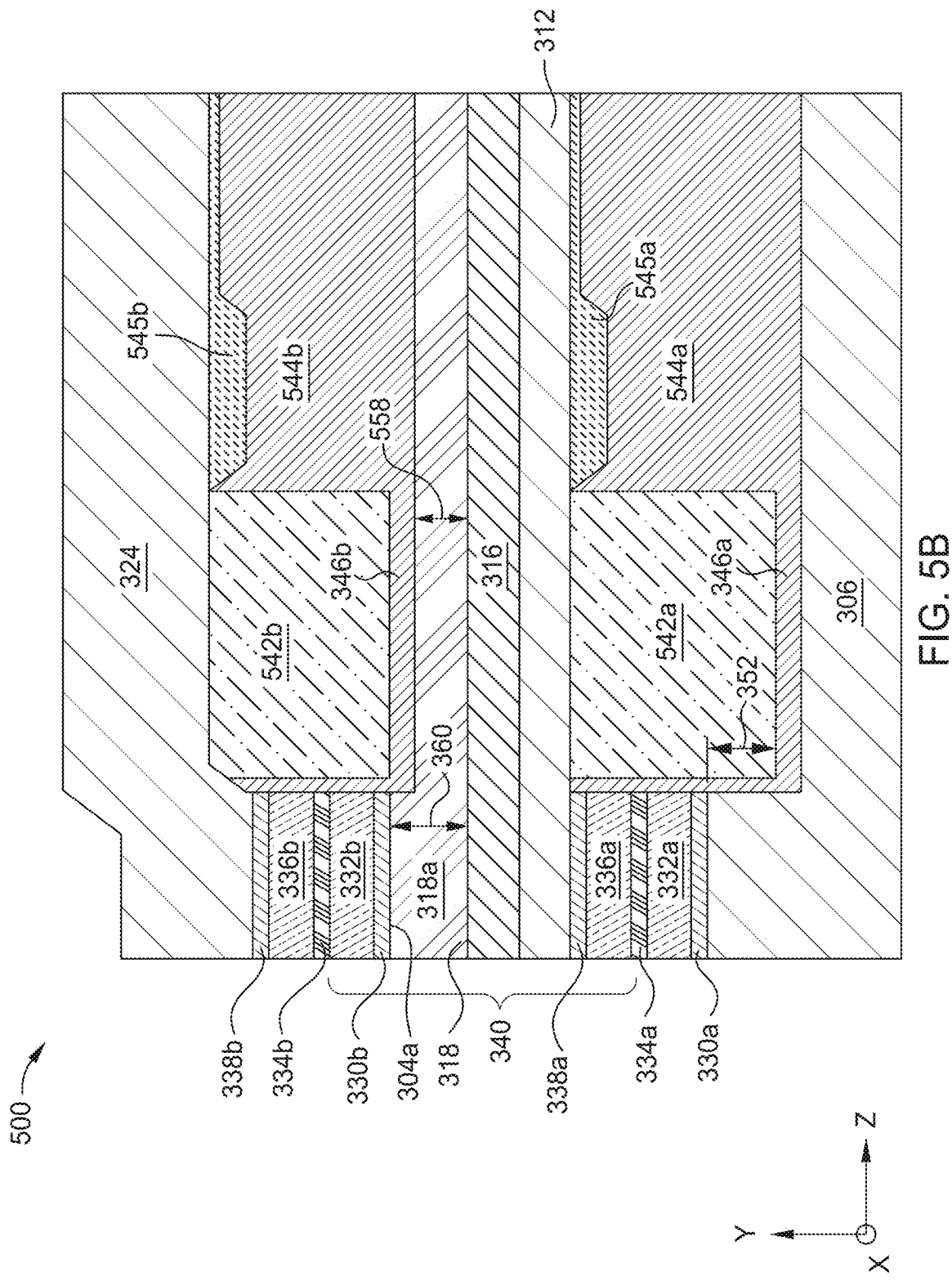

FIGS. 5A-5B illustrate various views of a dual free layer (DFL) two dimensional magnetic recording (TDMR) read head 500 comprising two sensors or readers 502, 504, according to another embodiment. The read head 500 of FIGS. 5A-5B may be similar to the read head 300 of FIGS. 3A-3B except where noted below. FIG. 5A illustrates a media facing surface (MFS) view of the DFL TDMR read head 500, with 515 denoting the middle shields and 518 denoting the second lower shield. FIG. 5B illustrates a cross-sectional view of the DFL TDMR read head 500, where the topographic features of the dielectric layer 544a, 545a behind the back edge of the first RHB structure 542a, and the topographic features of the dielectric layer 544b, 545b behind the back edge of the second RHB structure 542b, are both flattened. The second lower shield 518 remains planar along the z-direction with a substantially constant thickness 558.

Figure 6:
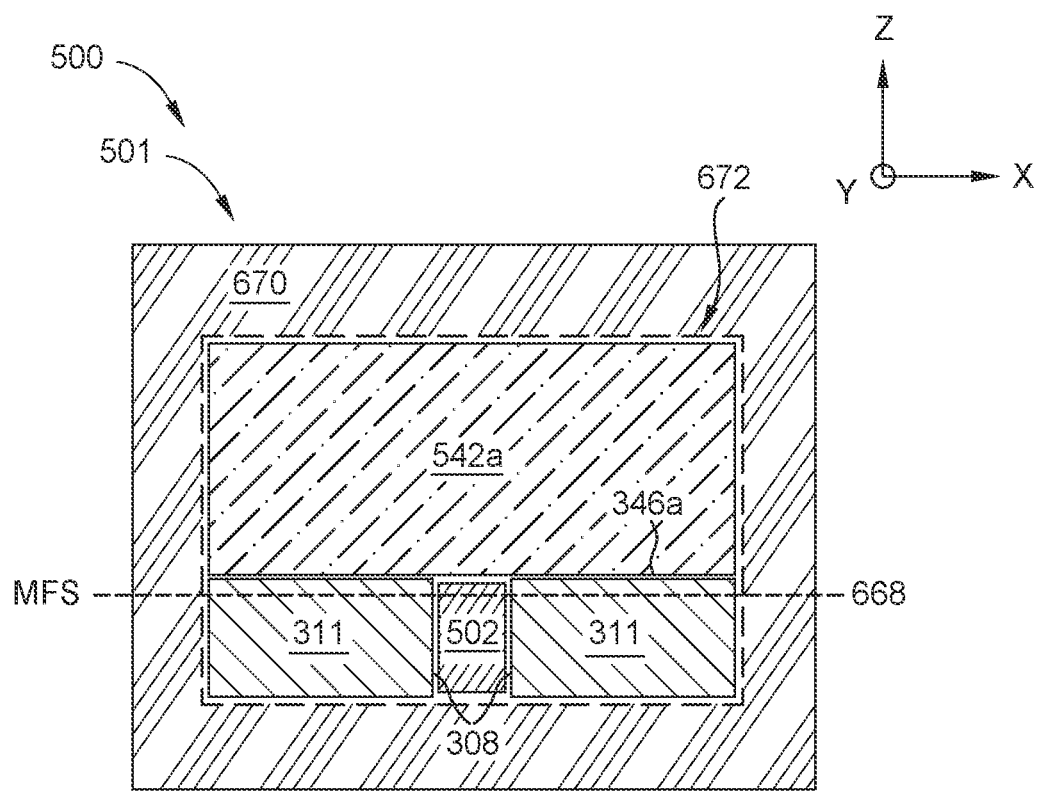
FIG. 6 illustrates a top, cross-sectional view of a portion of the DFL TDMR read head of FIGS. 4A-4B or FIGS. 5A-5B while the DFL TDMR read head is being formed, according to one embodiments.

FIG. 6 illustrates a top, cross-sectional view of a portion of the DFL TDMR read head 500 of FIGS. 5A-5B (or the DFL TDMR read head 400 of FIGS. 4A-4B) while the DFL TDMR read head 500 is being formed, according to one embodiment. FIG. 6 illustrates a top view of the first sensor 502, the first RHB structure 542a, and the second soft bias layers 311. As such, layers below any of the first sensor 502, the first RHB structure 542a, and the second soft bias layers 311, such as the first soft bias layers 310, are not shown. The first sensor 502, soft bias shields 311, and the first RHB structure 542a may collectively be referred to as the lower reader 501 herein.

After the first sensor 502, soft bias shields 311, the first RHB structure 542a, and the insulation layers 308 and 346a are formed and/or deposited, unwanted portions of the first sensor 502, soft bias layers 311, the first RHB structure 542a, and insulation layer 308 (along with the layers above and/or below) are removed by ion milling to form the MFS and to define the dimensions of the lower reader 501, as shown by the dashed lines labeled 668 and 672. Upon removing the unwanted portions of the first sensor 502, soft bias layers 311, the first RHB structure 542a, the first RHB structure 542a has a width in the x-direction substantially equal to a collective width of the first sensor 502 and soft bias layers 311 in the x-direction. A refill layer 670, which may be referred to as a dielectric layer 670, is then deposited around the outer perimeter of the remaining the first sensor 502, soft bias layers 311, and the first RHB structure 542a to level the overall surface of the lower reader 502 for down-stream formation of the middle shields 515 and upper reader 504. The dielectric layer 670 comprises a dielectric material, such as $Al_2O_3$, $SiO_2$, MgO, and combinations thereof.

However, the dielectric layer 670 may have an uneven or non-uniform thickness in the y-direction, like shown in FIG. 3B (see above discussion related to the thickness non-uniformity for the dielectric layer 344a). A procedure is required to flattening the topography inherited from the deposition of the dielectric layer. FIG. 4B and FIG. 5B are exemplary results from the two approaches applied in FIGS. 7A-7D and FIG. 8A-8C. Portions of the dielectric layer 670 may need to be removed, or filled with a sacrificial layer and later removed in order for the dielectric layer 670, the first sensor 502, soft bias shields 311, and the first RHB structure 542a to form a substantially flat or linear surface, which allows the middle shields 515 to be deposited or formed thereon substantially flat or linear as well.

FIGS. 7A-7D illustrate schematic cross-sectional views of flattening the topography of the dielectric layer 770 (e.g., dielectric layer 444a of FIG. 4B) surrounding the lower reader 401 of the DFL TDMR read head 400 of FIGS. 4A-4B to form a substantially flat or linear surface, according to one embodiment. While not shown, the lower reader 401 may be disposed on a lower shield, such as the first shield 306 of FIGS. 4A-4B. Furthermore, since FIGS. 7A-7D are schematic illustrations, FIGS. 7A-7D may not be shown to scale or include specific details. For example, the lower reader 401 is generally represented as a whole, and does not show the first RHB structure 442a extending further into a lower shield in the y-direction than the first sensor 402, as shown and discussed above in FIGS. 4A-4B.

Figure 7A:
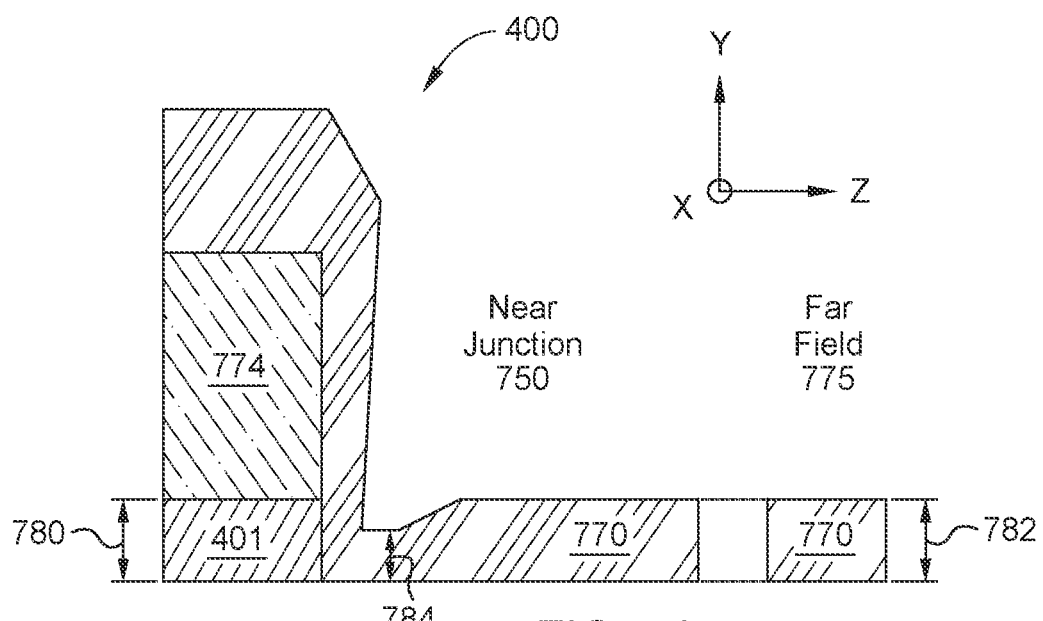
FIGS. 7A-7D illustrate cross-sectional views of flattening the topography of a dielectric layer surrounding a lower reader of the DFL TDMR read head of FIGS. 4A-4B to form a substantially flat or linear surface, according to one embodiment.

In FIG. 7A, a photoresist 774 is disposed over the lower reader 401 to protect the lower reader 401 from being etched away during subsequent processes. The dielectric layer 770, which may be the dielectric layer 670 shown in FIG. 6, is then deposited around the lower reader 401, like described above in FIG. 6, and on the photoresist 774.

However, due to the deposition process, the dielectric layer 770 may be uneven or non-uniform. For example, a near junction 750 portion of the dielectric layer 770 disposed adjacent to the lower reader 401 and the photoresist 774 may be thinner in the y-direction than a far field 775 portion of the dielectric layer 770 disposed further from the lower reader 401. Thus, while the far field 775 portion of the dielectric layer 770 may have a thickness 782 substantially equal to the thickness 780 of the lower reader 401, such as about 40 nm, the near junction 750 portion has a thickness 784 less than the thickness 780 of the lower reader 401 by about 10 nm.

Figure 7B:
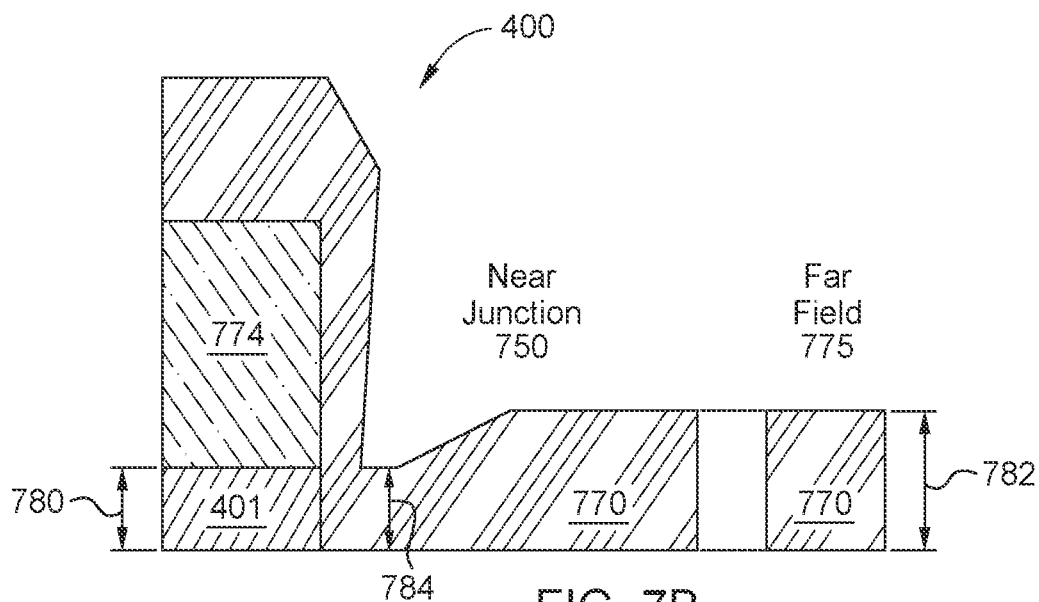

The compensation for the unevenness of the dielectric layer 770 requires the deposition of a greater thickness, such as about 55 nm, so that the near junction portion 750 has a thickness 784 substantially equal to the thickness 780 of the lower reader 401, such as about 40 nm, like shown in FIG. 7B.

Figure 7C:
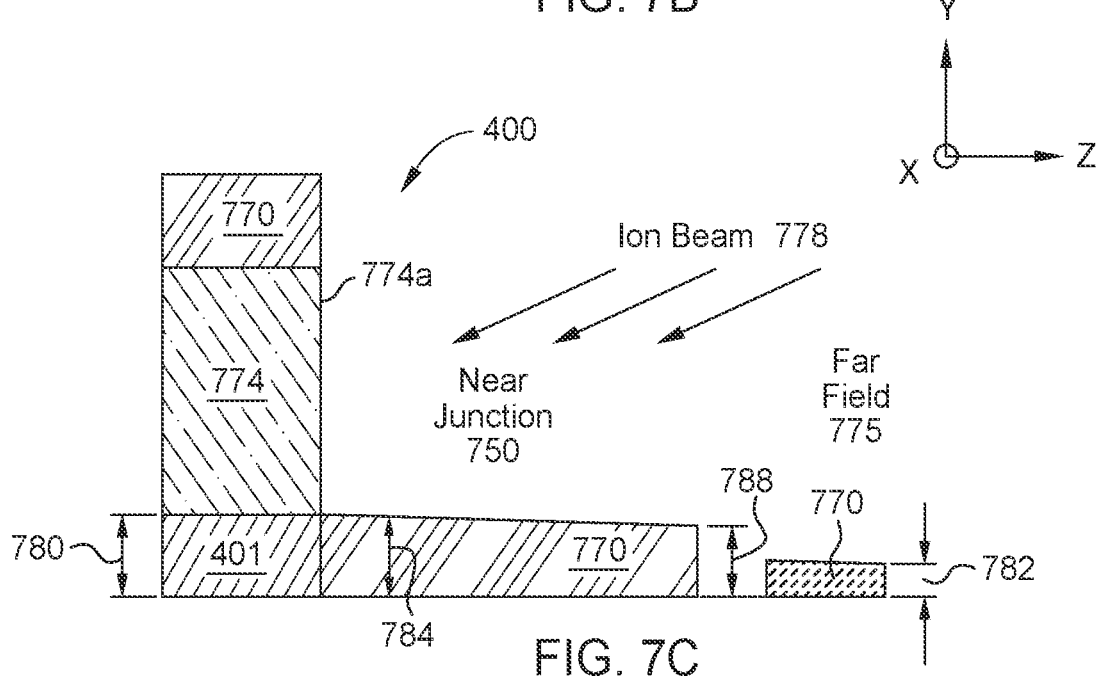

In FIG. 7C, a high angle ion beam mill 778, such as about 80 degrees, is performed to expose a sidewall 774a of the photoresist 774 for later lift off or removal of the photoresist 774, removing portion of the dielectric layer 770 disposed adjacent to the sidewall 774a. The high angle ion beam mill 778 also removes portions of the dielectric layer 770 from near junction 750 to the far field 775 direction, flattening the topography inherited from the deposition of the dielectric layer. The thickness 782 of the far field 775 portion of the dielectric layer 770 substantially equal to the deposition thickness of the dielectric layer subtracted the targeted ion mill removal amount. The remaining portion of the dielectric layer 770 at the near junction 750 has a thickness 784 is substantially equal to the thicknesses 780 of the lower reader 401. In other words, the dielectric layer 770 is flattened without any unevenness at the near junction 750, tapering down to the far field 775, such that the thickness 788 between the near junction 750 and the far field 770 is less than the thickness 784 but greater than the thickness 782.

Figure 7D:
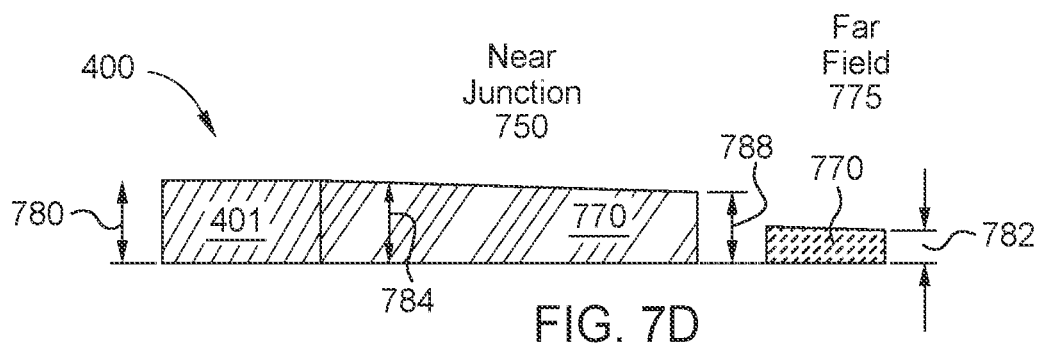

In FIG. 7D, the photoresist 774 is lifted off. Removing the photoresist 774 results in the lower reader 401 and the dielectric layer 770 having a substantially flat surface or flat topography gradually tapering down to the far field, where the thickness 784 of the dielectric layer 770 at the near junction 750 is substantially equal to the thickness 780 of the lower reader 401 and the thickness 782 of the dielectric layer 770 in the far field 775 is substantially equal to the deposition thickness of the dielectric layer subtracted by the targeted ion mill removal amount. In other words, the dielectric layer 770 has a substantially flat surface with a gentle thickness tapering in the y-direction. As such, the lower reader 401 and dielectric layer 770 are able to provide a flat surface for the formation of the middle shields 415, resulting in the middle shields 415 also having a substantially flat surface or flat topography, like shown above in FIGS. 4A-4B, such that the middle shields 415 extend substantially linearly from the MFS into the read head 400.

Figure 8A:
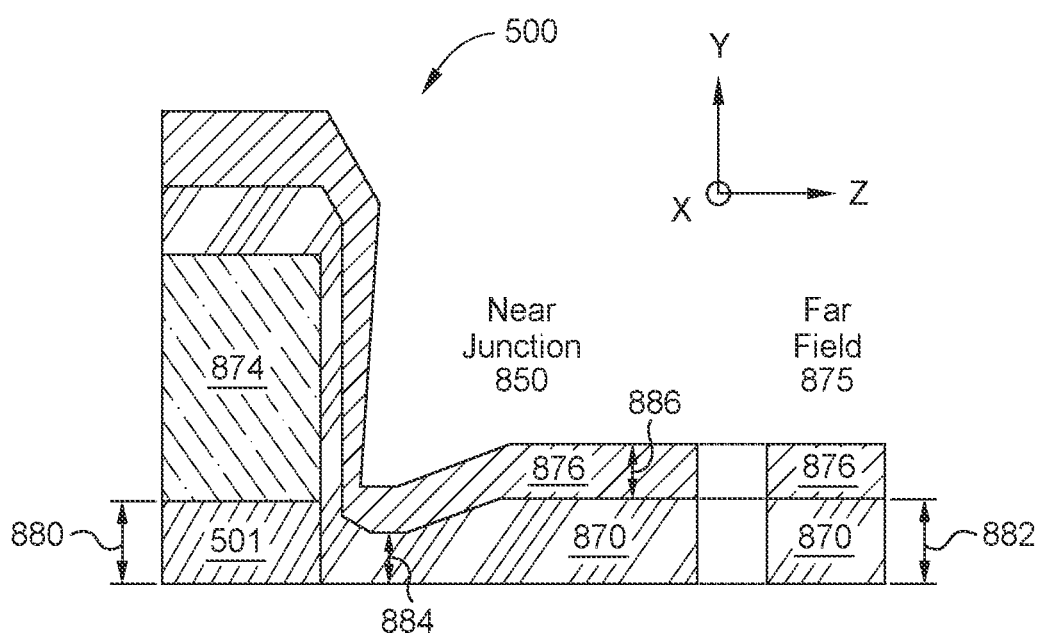

FIGS. 8A-8C illustrate schematic cross-sectional views of flattening the topography of the dielectric layer 870 (e.g., dielectric layer 544a of FIG. 5B) surrounding the lower reader 501 of the DFL TDMR read head 500 of FIGS. 5A-5B to form a substantially flat or linear surface, according to another embodiment. While not shown, the lower reader 501 may be disposed on a lower shield, such as the first shield 306 of FIGS. 5A-5B. Furthermore, since FIGS. 8A-8C are schematic illustrations, FIGS. 8A-8C may not be shown to scale or include specific details. For example, the lower reader 501 is generally represented as a whole, and does not show the RHB structure 542a extending further into a lower shield in the y-direction than the first sensor 502, as shown and discussed above in FIGS. 5A-5B.

To compensate for the unevenness of the dielectric layer 870 (which may be the dielectric 670 shown in FIG. 6 or the dielectric layer 545a shown in FIG. 5B), a cap layer 876 is deposited on the dielectric layer 870 according to another embodiment, as shown in FIG. 8A. A thickness 886 of the cap layer 876 may be smaller or greater than a thickness 882 of the dielectric layer 870. In some embodiments, the thickness 886 is about 20 to 50 nm. The thickness 886 may depend on whether a portion of the cap layer 876 will be retained after the flattening procedure and whether the thickness of that portion of the cap layer 876 and the thickness of the underlying dielectric layer 870 collectively are substantially equal to the thickness 880 of the lower reader 501.

In FIG. 8B, a high angle ion beam mill 878, such as about 80 degrees, is performed to expose a sidewall 874a of the photoresist 874 for later lift off or removal of the photoresist 874, removing portions of the dielectric layer 870 and the cap layer 876 disposed adjacent to the sidewall 874a. The high angle ion beam mill 878 further removes some portion of the cap layer 876 in the far field 875 direction, leaving portions of the cap layer 876a at the near junction 850 and also to the far field 875. The remaining portion of the cap layer 876a at the near junction 850 compensates for the reduced thickness 884 of the dielectric layer 870 at the near junction 850 such that the cumulative thickness 888 of the dielectric layer 870 and the cap layer 876a at the near junction 850 is substantially equal to the thickness 880 of the lower reader 501 and the thickness 882 of the far field 875 portion of the dielectric layer 870 plus any remaining cap layer there. In other words, the cap layer 876a fills in any unevenness in the dielectric layer 870 at the near junction 850. The remaining portion of the cap layer 876a at the near junction 850 and the cap layer 876 disposed at the far field 875 may collectively be referred to as cap layer 876.

Figure 9:
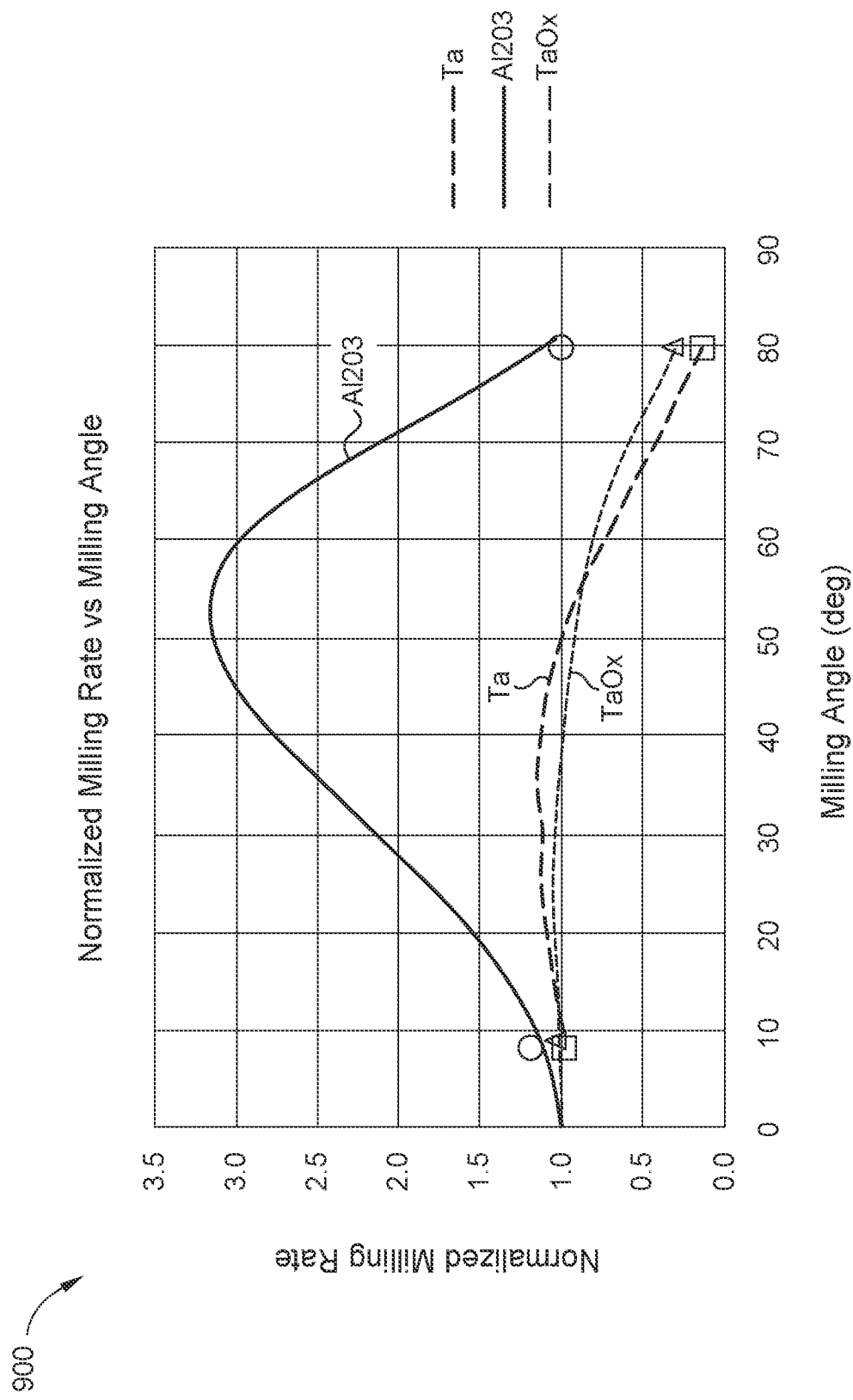
FIG. 9 illustrates a graph of normalized milling rates versus milling angles for various materials, according to various embodiments.

The cap layer 876 can comprise a metal material, such as Ta, or a dielectric material, such as TaOx, where x is an integer greater than 1. FIG. 9 illustrates a graph 900 of normalized milling rates versus milling angles for various materials, according to one embodiment. The graph 900 compares the milling rates and milling angles of Ta, TaOx, and $Al_2O_3$. As shown by the graph 900, Ta and TaOx have a similar angular dependence of milling rates and higher angular selectivity than $Al_2O_3$, or the ratio of the milling rate at 10 degrees vs. 80 degrees. Higher selectivity is favored, specifically, in removing minimal amount at 80 degree of the deposited layer in the field for fully opening the photoresist sidewall by the complementary angle at 10 degrees. These two materials are therefore more suitable to be used for the cap layer 876, 876a than $Al_2O_3$ in effectiveness to open the photoresist 874 sidewall 874a for photoresist liftoff while removing the unevenness of the dielectric layer. However, if Ta were used as the material of the cap layer 876, the conductive nature of the Ta, even with only the portion of the cap layer 876a near the junction 850 remaining, may result in electrical shunting of the read head. The dielectric nature makes TaOx the best material for the cap layer 876. Because TaOx has a high etch selectivity at particular milling angles, the unwanted portions of TaOx can be fully removed without milling the $Al_2O_3$ dielectric layer 870 disposed below it, and without causing electrical shunting for any portion of the TaOx remaining after the ion mill described above in FIG. 8B.

Because the cap layer 876 comprises a dielectric material, the cap layer 876 can remain in the final read head 500, as the cap layer 876 will not shunt the read head 500.

In FIG. 8C, the photoresist 874 is lifted off. Removing the photoresist 874 results in the lower reader 501 and the dielectric layer 870 and/or cap layer 876 having a substantially planar surface or flat topography, where the thickness 888 of the dielectric layer 870 and cap layer 876 at the near junction 850 collectively is substantially equal to the thickness 880 of the lower reader 501 and to the thickness 882 of the dielectric layer 870 and/or the cap layer 876 collectively in the far field 875. In other words, the dielectric layer 870 and/or cap layer 876 collectively form one dielectric layer having a substantially constant or consistent thickness in the y-direction. As such, the lower reader 501 and the dielectric layer 870 together with the cap layer 876 are able to provide a level surface for the formation of the middle shields 515, resulting in the middle shields 515 also having a substantially planar surface or flat topography, like shown above in FIGS. 5A-5B, such that the middle shields 515 extend substantially linearly from the MFS into the read head 500.

Thus, the best approach to form a substantially flat topography of the lower reader, the refill layer and the cap layer is to use a cap layer comprising TaOx disposed on a refill layer then perform ion milling the lower reader of a read head, resulting in the middle shields also having a substantially flat topography. Further, the TaOx cap layer can remain in the final read head without causing electrical shunting. The middle shield having a substantially flat topography allows the read head to operate in TDMR mode more effectively, and results in better performance in terms of areal density capacity (ADC) and higher reliability in terms of head instability (HI). Moreover, the performance and reliability of the read head, both magnetically and electronically, are increased and improved.

In one embodiment, a read head comprises a first sensor disposed at a media facing surface (MFS), a first rear hard bias (RHB) structure disposed adjacent to the first sensor recessed from the MFS, first soft bias shields disposed adjacent to the first sensor at the MFS, a dielectric layer disposed around an outer perimeter of the first sensor, the first soft bias shields, and the first RHB structure, the dielectric layer being substantially planar, wherein the dielectric layer comprises TaOx, where x is an integer greater than 1, a middle shield disposed over the first sensor, the first soft bias shields, and the first RHB structure, the middle shield being substantially planar, and a second sensor disposed at the MFS on the middle shield.

The read head further comprises a second RHB structure disposed adjacent to the second sensor on the middle shield, the second RHB structure being recessed from the MFS, second soft bias shields disposed adjacent to the second sensor at the MFS, a first lower shield, the first sensor and the first RHB structure being disposed on the lower shield, and a first upper shield disposed on the second sensor and the second RHB structure.

A portion of the dielectric layer comprising TaOx is disposed adjacent to at least one of the first RHB structure and the first soft bias shields. The first sensor and the second sensor are each a dual free layer (DFL) sensor. A thickness of the dielectric layer is substantially equal to a thickness of the RHB structure. The dielectric layer further comprises $Al_2O_3$, $SiO_2$, MgO, and combinations thereof. A thickness of the first sensor is substantially equal to the thickness of the RHB structure, and a thickness of the first soft bias shields is substantially equal to the thickness of the first sensor. The middle shield extends substantially linearly from the MFS into the read head. The first sensor and the first soft bias shields have a collective width at the MFS substantially equal to a width of the RHB structure. The middle shield comprises a second upper shield disposed over the first sensor and the first RHB structure, a read separation gap disposed on the second upper shield, and a second lower shield disposed on the read separation gap. A magnetic recording device comprises the read head.

In another embodiment, a method of forming a read head comprises forming a lower reader, the lower reader comprising a first sensor disposed at a media facing surface (MFS), a first rear hard bias (RHB) structure disposed adjacent to the first sensor recessed from the MFS, and first soft bias shields disposed adjacent to the first sensor at the MFS, defining one or more dimensions of the lower reader, ion milling portions of the dielectric layer such that the remaining portions of the dielectric layer form a substantially flat layer that gradually tapers down from near the first sensor, the first RHB structure, and the first soft bias shields to a far field location, the far field location being spaced from the first sensor, the first RHB structure, and the first soft bias shields, forming a middle shield over the substantially planar layer and the lower reader, and forming an upper reader over the middle shield.

The dielectric layer comprises $Al_2O_3$, $SiO_2$, MgO, and combinations thereof. The ion milling is performed at an angle of about 80 degrees. The method further comprises depositing a photoresist on the lower reader prior to depositing the dielectric layer, and removing the photoresist prior to forming the middle shield. A thickness of the dielectric layer disposed near the first sensor, the first RHB structure, and the first soft bias shields is substantially equal to a thickness of the first sensor, the first RHB structure, and the first soft bias shields. The middle shield is substantially flat, and wherein the middle shield extends substantially linearly from the MFS into the read head. The middle shield comprises a first shield disposed over the lower reader, a read separation gap disposed on the first shield, and a second shield disposed on the read separation gap, wherein each of the first shield, the read separation gap, and the second shield are substantially flat. The upper reader comprises a second sensor disposed at the MFS, a second RHB structure disposed adjacent to the second sensor recessed from the MFS, and second soft bias shields disposed adjacent to the second sensor at the MFS. A magnetic recording device comprises the read head formed by the method.

In yet another embodiment, a method of forming a read head comprises forming a lower reader, the lower reader comprising a first sensor disposed at a media facing surface (MFS), a first rear hard bias (RHB) structure disposed adjacent to the first sensor recessed from the MFS, and first soft bias shields disposed adjacent to the first sensor at the MFS, defining one or more dimensions of the lower reader, depositing a dielectric layer around an outer perimeter of the lower reader, depositing a TaOx layer, where x is a numeral, on the dielectric layer, ion milling portions of the TaOx layer such that the remaining portions of the TaOx layer and the dielectric layer collectively form a substantially planar layer, forming a middle shield over the substantially planar layer and the lower reader, and forming an upper reader over the middle shield.

The dielectric layer comprises $Al_2O_3$. The ion milling is performed at an angle of about 80 degrees. The remaining portions of the TaOx layer are disposed adjacent to the lower reader. The method further comprises depositing a photoresist on the lower reader prior to depositing the dielectric layer, and removing the photoresist prior to forming the middle shield. A thickness of the substantially planar layer is substantially equal to a thickness of the first sensor, the first RHB structure, and the first soft bias shields. The middle shield is substantially planar, and the middle shield extends substantially linearly from the MFS into the read head. The middle shield comprises a first shield disposed over the lower reader, a read separation gap disposed on the first shield, and a second shield disposed on the read separation gap, wherein each of the first shield, the read separation gap, and the second shield are substantially planar. A magnetic recording device comprising the read head formed by the method.

While the foregoing is directed to embodiments of the present disclosure, other and further embodiments of the disclosure may be devised without departing from the basic scope thereof, and the scope thereof is determined by the claims that follow.

What is claimed is:

1. A read head, comprising:
   a first sensor disposed at a media facing surface (MFS);
   a first rear hard bias (RHB) structure disposed adjacent to the first sensor recessed from the MFS;
   first soft bias shields disposed adjacent to the first sensor at the MFS;
   a dielectric layer disposed around an outer perimeter of the first sensor, the first soft bias shields, and the first RHB structure, the dielectric layer being substantially planar;
   a cap layer disposed on the dielectric layer, the cap layer comprising TaOx, where x is an integer greater than 1;
   a middle shield disposed over the first sensor, the first soft bias shields, and the first RHB structure, the middle shield being substantially planar; and
   a second sensor disposed at the MFS on the middle shield.

2. The read head of claim 1, further comprising:
   a second RHB structure disposed adjacent to the second sensor on the middle shield, the second RHB structure being recessed from the MFS;
   second soft bias shields disposed adjacent to the second sensor at the MFS;
   a first lower shield, the first sensor and the first RHB structure being disposed on the lower shield; and
   a first upper shield disposed on the second sensor and the second RHB structure.

3. The read head of claim 1, wherein a portion of the cap layer comprising TaOx is disposed adjacent to at least one of the first RHB structure and the first soft bias shields.

4. The read head of claim 1, wherein the first sensor and the second sensor are each a dual free layer (DFL) sensor.

5. The read head of claim 1, wherein a thickness of the dielectric layer and the cap layer is substantially equal to a thickness of the first RHB structure, and wherein the dielectric layer comprises $Al_2O_3$, $SiO_2$, MgO, or combinations thereof.

6. The read head of claim 5, wherein a thickness of the first sensor is substantially equal to the thickness of the first RHB structure, and wherein a thickness of the first soft bias shields is substantially equal to the thickness of the first sensor.

7. The read head of claim 1, wherein the middle shield extends substantially linearly from the MFS into the read head.

8. The read head of claim 1, wherein the first sensor and the first soft bias shields have a collective width at the MFS substantially equal to a width of the first RHB structure.

9. The read head of claim 1, wherein the middle shield comprises a second upper shield disposed over the first sensor and the first RHB structure, a read separation gap disposed on the second upper shield, and a second lower shield disposed on the read separation gap.

10. A magnetic recording device comprising the read head of claim 1.

11. A magnetic recording device, comprising:
    a read head formed by a method comprising:
    forming a lower reader, the lower reader comprising a first sensor disposed at a media facing surface (MFS), a first rear hard bias (RHB) structure disposed adjacent to the first sensor recessed from the MFS, and first soft bias shields disposed adjacent to the first sensor at the MFS;
    defining one or more dimensions of the lower reader;

depositing a dielectric layer around an outer perimeter of the lower reader;

depositing a TaOx layer, where x is a numeral, on the dielectric layer;

ion milling portions of the TaOx layer such that the remaining portions of the TaOx layer and the dielectric layer collectively form a substantially planar layer;

forming a middle shield over the substantially planar layer and the lower reader; and forming an upper reader over the middle shield.

12. The magnetic recording device of claim 11, wherein the read head further comprises:

a second RHB structure disposed adjacent to the upper reader on the middle shield, the second RHB structure being recessed from the MFS;

second soft bias shields disposed adjacent to the upper reader at the MFS;

a first lower shield, the lower reader and the first RHB structure being disposed on the lower shield; and a first upper shield disposed on the upper reader and the second RHB structure.

13. The magnetic recording device of claim 11, wherein a portion of the TaOx layer is disposed adjacent to at least one of the first RHB structure and the first soft bias shields.

14. The magnetic recording device of claim 11, wherein the lower reader and the upper reader are each a dual free layer (DFL) sensor.

15. The magnetic recording device of claim 11, wherein a thickness of the dielectric layer and the TaOx layer is substantially equal to a thickness of the first RHB structure, and wherein the dielectric layer comprises $Al_2O_3$, $SiO_2$, MgO, or combinations thereof.

16. The magnetic recording device of claim 11, wherein a thickness of the lower reader is substantially equal to the thickness of the first RHB structure, and wherein a thickness of the first soft bias shields is substantially equal to the thickness of the lower reader.

17. The magnetic recording device of claim 11, wherein the middle shield extends substantially linearly from the MFS into the read head.

18. The magnetic recording device of claim 11, wherein the lower reader and the first soft bias shields have a collective width at the MFS substantially equal to a width of the first RHB structure.

19. The magnetic recording device of claim 11, wherein the middle shield comprises a second upper shield disposed over the lower reader and the first RHB structure, a read separation gap disposed on the second upper shield, and a second lower shield disposed on the read separation gap.

20. A read head, comprising:

a first dual free layer (DFL) reader disposed at a media facing surface (MFS);

a first rear hard bias (RHB) structure disposed adjacent to the first DFL reader recessed from the MFS;

first soft bias shields disposed adjacent to the first DFL reader at the MFS;

a dielectric layer disposed around an outer perimeter of the first DFL reader, the first soft bias shields, and the first RHB structure, the dielectric layer being substantially planar;

a cap layer disposed on the dielectric layer, the cap layer comprising TaOx, where x is an integer greater than 1;

a middle shield disposed over the first DFL reader, the first soft bias shields, and the first RHB structure, the middle shield being substantially planar; and a second DFL reader disposed at the MFS on the middle shield.

21. The read head of claim 20, further comprising:

a second RHB structure disposed adjacent to the second DFL reader on the middle shield, the second RHB structure being recessed from the MFS;

second soft bias shields disposed adjacent to the second DFL reader at the MFS;

a first lower shield, the first DFL reader and the first RHB structure being disposed on the lower shield; and a first upper shield disposed on the second sensor and the second RHB structure.

22. The read head of claim 20, wherein a portion of the cap layer is disposed adjacent to at least one of the first RHB structure and the first soft bias shields.

23. The read head of claim 20, wherein a thickness of the dielectric layer and the cap layer is substantially equal to a thickness of the first RHB structure, and wherein the dielectric layer comprises $Al_2O_3$, $SiO_2$, MgO, or combinations thereof.

24. The read head of claim 20, wherein a thickness of the first DFL reader is substantially equal to the thickness of the first RHB structure, and wherein a thickness of the first soft bias shields is substantially equal to the thickness of the first DFL reader.

25. The read head of claim 20, wherein the middle shield extends substantially linearly from the MFS into the read head.

26. The read head of claim 20, wherein the first DFL reader and the first soft bias shields have a collective width at the MFS substantially equal to a width of the first RHB structure.

27. The read head of claim 20, wherein the middle shield comprises a second upper shield disposed over the first DFL reader and the first RHB structure, a read separation gap disposed on the second upper shield, and a second lower shield disposed on the read separation gap.

28. A magnetic recording device comprising the read head of claim 20.

* * * * *